United States Patent
Inoue et al.

(10) Patent No.: US 9,224,424 B2
(45) Date of Patent: Dec. 29, 2015

(54) DATA RECORDING/REPRODUCING DEVICE, ARCHIVE SYSTEM, AND RECORDING CONTROL METHOD

(71) Applicants: Hitachi-LG Data Storage, Inc., Tokyo (JP); Hitachi Consumer Electronics Co, Ltd., Tokyo (JP)

(72) Inventors: Masayuki Inoue, Tokyo (JP); Chiyo Ohno, Tokyo (JP); Masayuki Kobayashi, Tokyo (JP); Akinobu Watanabe, Tokyo (JP)

(73) Assignees: HITACHI-LG DATA STORAGE, INC., Tokyo (JP); HITACHI CONSUMER ELECTRONICS CO., LTD., Tokyo (JP)

( * ) Notice: Subject to any disclaimer, the term of this patent is extended or adjusted under 35 U.S.C. 154(b) by 0 days.

(21) Appl. No.: 14/189,786

(22) Filed: Feb. 25, 2014

(65) Prior Publication Data

US 2014/0286152 A1 Sep. 25, 2014

(30) Foreign Application Priority Data

Mar. 25, 2013 (JP) ................................ 2013-061300

(51) Int. Cl.
*G11B 20/18* (2006.01)
*G11B 20/12* (2006.01)

(52) U.S. Cl.
CPC ........ *G11B 20/1889* (2013.01); *G11B 20/1217* (2013.01)

(58) Field of Classification Search
None
See application file for complete search history.

(56) References Cited

U.S. PATENT DOCUMENTS

| | | | | |
|---|---|---|---|---|
| 5,107,481 A * | 4/1992 | Miki et al. | ................ | 369/53.21 |
| 6,115,338 A * | 9/2000 | Masaki et al. | ............ | 369/47.52 |
| 6,151,281 A * | 11/2000 | Van Der Enden et al. | . | 369/30.11 |
| 6,738,333 B1 * | 5/2004 | Zaharris et al. | ........... | 369/59.25 |
| 7,055,017 B2 * | 5/2006 | Ozaki | ......................... | 711/220 |
| 7,616,546 B2 * | 11/2009 | Van Der Enden et al. | . | 369/53.24 |
| 2002/0136134 A1 * | 9/2002 | Ito et al. | ..................... | 369/53.36 |
| 2003/0081521 A1 * | 5/2003 | Solomon et al. | .......... | 369/53.21 |
| 2004/0090886 A1 * | 5/2004 | Sasaki | ......................... | 369/47.1 |
| 2005/0007910 A1 * | 1/2005 | Ito et al. | ..................... | 369/47.14 |
| 2005/0254411 A1 * | 11/2005 | Kondo | ........................ | 369/275.1 |
| 2006/0090176 A1 * | 4/2006 | Schmidtke et al. | .......... | 720/632 |
| 2006/0239162 A1 * | 10/2006 | Fushimi et al. | ............ | 369/53.24 |
| 2006/0285449 A1 * | 12/2006 | Tazaki | ......................... | 369/44.26 |
| 2007/0286060 A1 * | 12/2007 | Nagashima | ................ | 369/275.3 |
| 2008/0273448 A1 * | 11/2008 | Nakamura | .................. | 369/275.3 |
| 2008/0310278 A1 * | 12/2008 | Brondijk et al. | ............... | 369/94 |
| 2010/0046337 A1 * | 2/2010 | Morishige et al. | ......... | 369/47.15 |
| 2010/0067339 A1 * | 3/2010 | Kaida et al. | ................ | 369/53.17 |
| 2011/0299369 A1 * | 12/2011 | Mutsuro et al. | ........... | 369/30.06 |
| 2012/0218877 A1 * | 8/2012 | Akahoshi | ......................... | 369/84 |

FOREIGN PATENT DOCUMENTS

| | | |
|---|---|---|
| JP | 10-283734 A | 10/1998 |
| JP | 2003-099923 A | 4/2003 |
| JP | 2005-135464 A | 5/2005 |

* cited by examiner

*Primary Examiner* — Peter Vincent Agustin
(74) *Attorney, Agent, or Firm* — Volpe and Koenig, P.C.

(57) ABSTRACT

A data recording/reproducing device for recording data on a recordable area of a recording medium in an arbitrary recording unit, includes a control unit that controls the operation of the data recording/reproducing device. The control unit designates a recording unit where data on the recordable area is not recorded as a non-use area, determines whether data has been recorded, or unrecorded in the recording unit on the recordable area, determines the recording unit designated as the non-use area to have been recorded, and records data in the recording unit determined to be unrecorded when data is recorded on the recording medium, under the control.

10 Claims, 14 Drawing Sheets

OPTICAL DISC

SECTOR RECORDING DIRECTION

| THE NUMBER OF AREAS | 1 | ~800 |
| START SECTOR NO. | 12000000 | ~801 |
| END SECTOR NO. | 12499999 | ~802 |

NON-USE AREA INFORMATION

SECTOR USE INFORMATION

DATA STORAGE SECTOR INFORMATION

FIG.12

| | | |
|---|---|---|
| THE NUMBER OF AREAS | 3 | ~1200 |
| START SECTOR NO. | 12000000 | ~1201 |
| END SECTOR NO. | 12499999 | ~1202 |
| START SECTOR NO. | 12500000 | ~1203 |
| END SECTOR NO. | 12999999 | ~1204 |
| START SECTOR NO. | 37000000 | ~1205 |
| END SECTOR NO. | 37499999 | ~1206 |

NON-USE AREA INFORMATION

DATA STORAGE SECTOR INFORMATION

DATA STORAGE SECTOR INFORMATION though the general-purpose optical disc is used.

In order to achieve the above object, for example, configurations according to the claims are applied.

According to the present invention, when data is stored in media such as the optical disc, data can be prevented from being stored in a designated specific area even if the specific area is a data writable area. Therefore, data is not allowed to be stored in the specific area in which data loss by damage or dirt is predicted with the result that a time for losing data stored in the media can be reduced.

BRIEF DESCRIPTION OF THE DRAWINGS

FIG. 12 is a diagram illustrating an example of non-use area information for indicating a sector not used for write when data is written in the optical disc having the three recording layers on the sector basis;

DETAILED DESCRIPTION

Embodiments of the present invention will be described in detail with reference to the attached drawings.

First Embodiment

Figure 1:
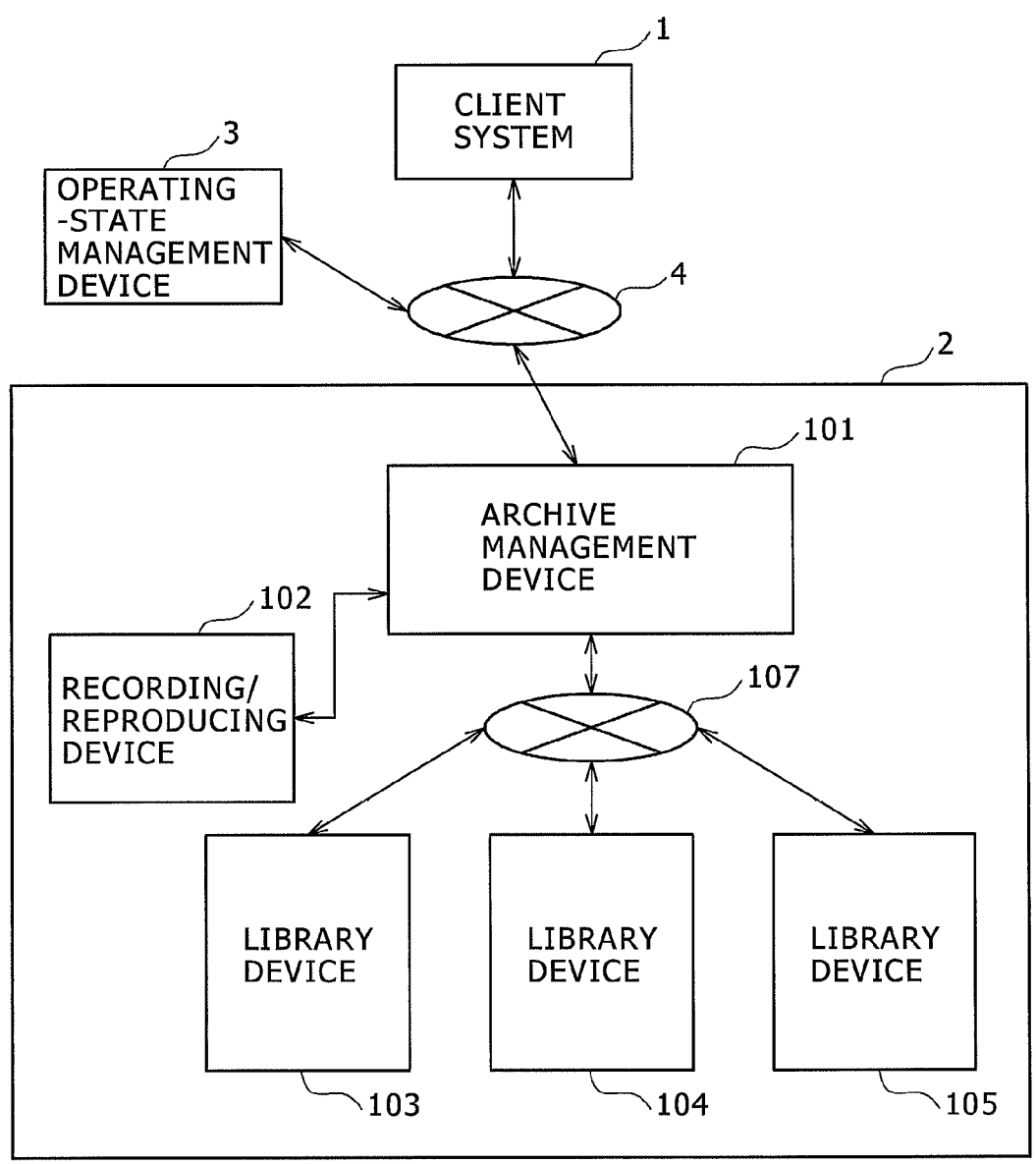
FIG. 1 is a block diagram illustrating a configuration example of a system.

FIG. 1 illustrates an example of a system configuration of an archive system employing an archive device according to this embodiment. The archive system is configured to store data such as an electronic document or video data provided in a client system for the purpose of storing data for a long period of time, or maintaining large-capacity data at low costs, and also take the stored data to return the data to the client system.

In this embodiment, an archive system including a client system 1, an archive device 2, and an operating-state management device 3 will be exemplified. The archive device 2, the client system 1, and the operating-state management device 3 are connected to each other over a network 4.

The client system 1 is an information system for operating and managing digital data such as electronic documents, electronic data, or video content data, and is configured by, for example, a traffic system, a broadcast system, and a genomic analysis system. Those systems have a lot of data in which data (hot data) frequently accessed and data (cold data) hardly accessed are present. The hot data is important in high speed of an access, and the cold data is required to be stored at low costs. In the archive system according to this embodiment, the hot data is stored in the client system 1, and the cold data is migrated to the archive device 2. As a result, a capacity of a fast-accessible data recording device of the client system 1 can be reduced. The fast-accessible data recording device is high in the costs, but reduced, as a result of which the costs of the overall archive system can be reduced. Further, because data migrated to the archive device 2 is stored in the client system 1 in a restorable state, data capacity required by the client system 1 can be also ensured.

The storage of data from the client system 1 to the archive device 2 is conducted by allowing the client system 1 to transmit an "archive request" command to the archive device 2. The archive device 2 records data file transmitted from the client system 1 on the recording medium. The restoration from the archive device 2 to the client system 1 is conducted by allowing the client system 1 to transmit a "retrieve request" command to the archive device 2. The archive device 2 reproduces the recording medium on which a file to be restored has been recorded, and transmits file data to the client system 1.

In the following description, to store data of the client system 1 into the archive device 2 may be expressed by "archive", and to restore data from the archive device 2 to the client system 1 may be expressed by "retrieve".

The archive device 2 includes an archive management device 101, a recording/reproducing device 102, and library devices 103, 104, and 105.

The archive management device 101 manages and controls the operation of the overall archive device 2. The archive management device 101 is connected to the client system 1 and the operating-state management device 3 other over the network 4. Also, the archive management device 101 is connected to the library devices 103, 104, and 105 over a local network 107 configured in the archive device 2. The archive management device 101 receives control requests such as "archive request" or "retrieve request" from the client system 1, transmits "library control command" to the recording/reproducing device 102, and the library devices 103, 104, 105 for control, and executes processing required by the client system 1. Also, the archive management device 101 transmits information related to the overall operation of the archive device 2 such as information on the operating state of the archive device or information on an archivable data volume according to the requests from the client system 1 or the operating-state management device 3. In this example, the "library control command" means various control commands to be transmitted to the library device 103 by the archive management device 101.

The recording/reproducing device 102 stores data and management information related to the control of the archive device 2 under the control of the archive management device 101. The recording/reproducing device 102 includes a hard disk and a semiconductor memory.

The library devices 103, 104, and 105 each record data on the recording medium, or reproduce the recording medium and reads data according to "library control command" transmitted from the archive management device 101. Files archived by the client system 1 are stored on recording media provided in the library devices 103, 104, and 105. In this embodiment, three library devices are provided. The number of library devices is one or more, and not limited to a specific number. The size of the archivable data becomes larger as the number of library devices is larger. Also, the costs of the archive device 2, and a volume necessary for installation are also increased. In this embodiment, because the library devices 103, 104, 105, and the archive management device 101 are connected to each other over the network, an increase or replacement of the library devices after the archive system has operated is eased.

The operating-state management device 3 is configured to monitor the operating state of the archive device 2. The operating-state management device 3 confirms the operation state of the archive device 2 remotely, or conducts maintenance operation such as updating of software, over the network 4.

Figure 2:
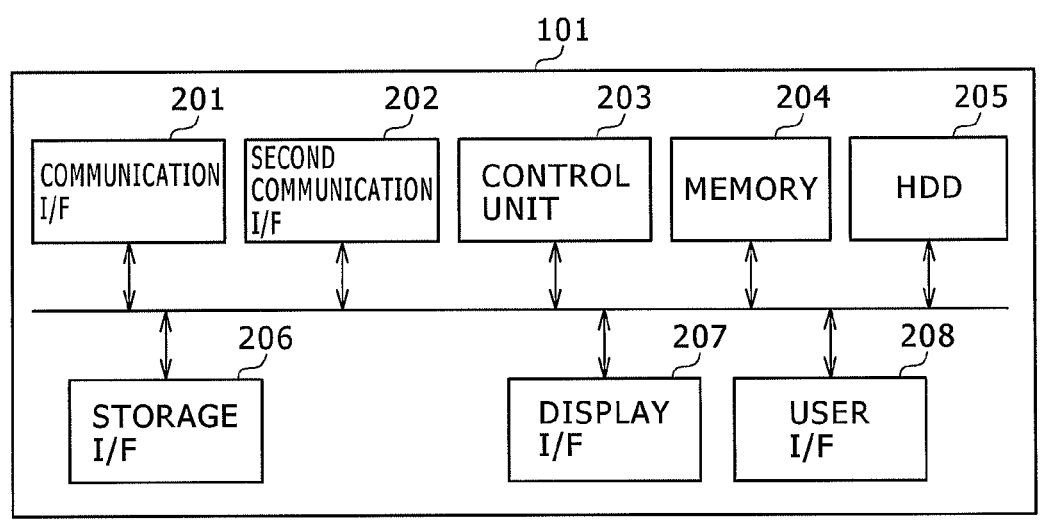
FIG. 2 is a block diagram illustrating a configuration example of an archive management device.

FIG. 2 is a block diagram illustrating a configuration example of the archive management device 101 according to this embodiment.

The archive management device 101 includes a communication interface (I/F) 201, a second communication interface (I/F) 202, a control unit 203, a memory 204, a hard disk drive (HDD) 205, a storage interface (I/F) 206, a display interface (I/F) 207, and a user interface (I/F) 208.

The communication interface (I/F) 201 is configured to transmit and receive "library control command" and data to be archived or retrieved with respect to the library devices 103, 104, and 105, and controls data transmission and reception.

The second communication interface (I/F) 202 is configured to transmit and receive a control command and data to be archived or retrieved with respect to the client system 1, and controls the data transmission and reception. The archive management device 101 also communicates with the operating-state management device 3 through the second communication interface (I/F) 202.

The control unit 203 executes programs for realizing the functions of a BIOS (basic input/output system), an OS (operating system), and the archive management device 101, and operates the archive management device 101.

The memory 204 is configured by a volatile memory and a nonvolatile memory. The memory 204 stores software such as the BIOS necessary to start the archive management device 101 in the nonvolatile memory. The memory 204 temporarily records data necessary for the operation of the software in the volatile memory.

The hard disk drive (HDD) 205 stores software for realizing the OS and the function of the archive management device 101, and information such as a configuration file therein. Those pieces of information may be stored in the memory 204.

The storage interface (I/F) 206 is configured to conduct a data communication with the recording/reproducing device 102. The storage interface (I/F) 206 conducts data transfer complying with standards such as an SATA (serial advanced technology attachment).

The display interface 207 is configured to generate and output a user interface (UI) screen for displaying various information such as the operating state of the archive device 2. The UI screen is output to a display device such as a liquid crystal display not shown.

The user interface 208 is an interface such as a keyboard or a mouse which inputs user operation. When the operating state of the archive device 2 cannot be confirmed from the operating-state management device 3, for example, a communication trouble of the network 4 occurs, the display device, the keyboard, or the mouse can be connected to the display interface 207 and the user interface 208 to directly confirm the operating state for operation.

Figure 3:
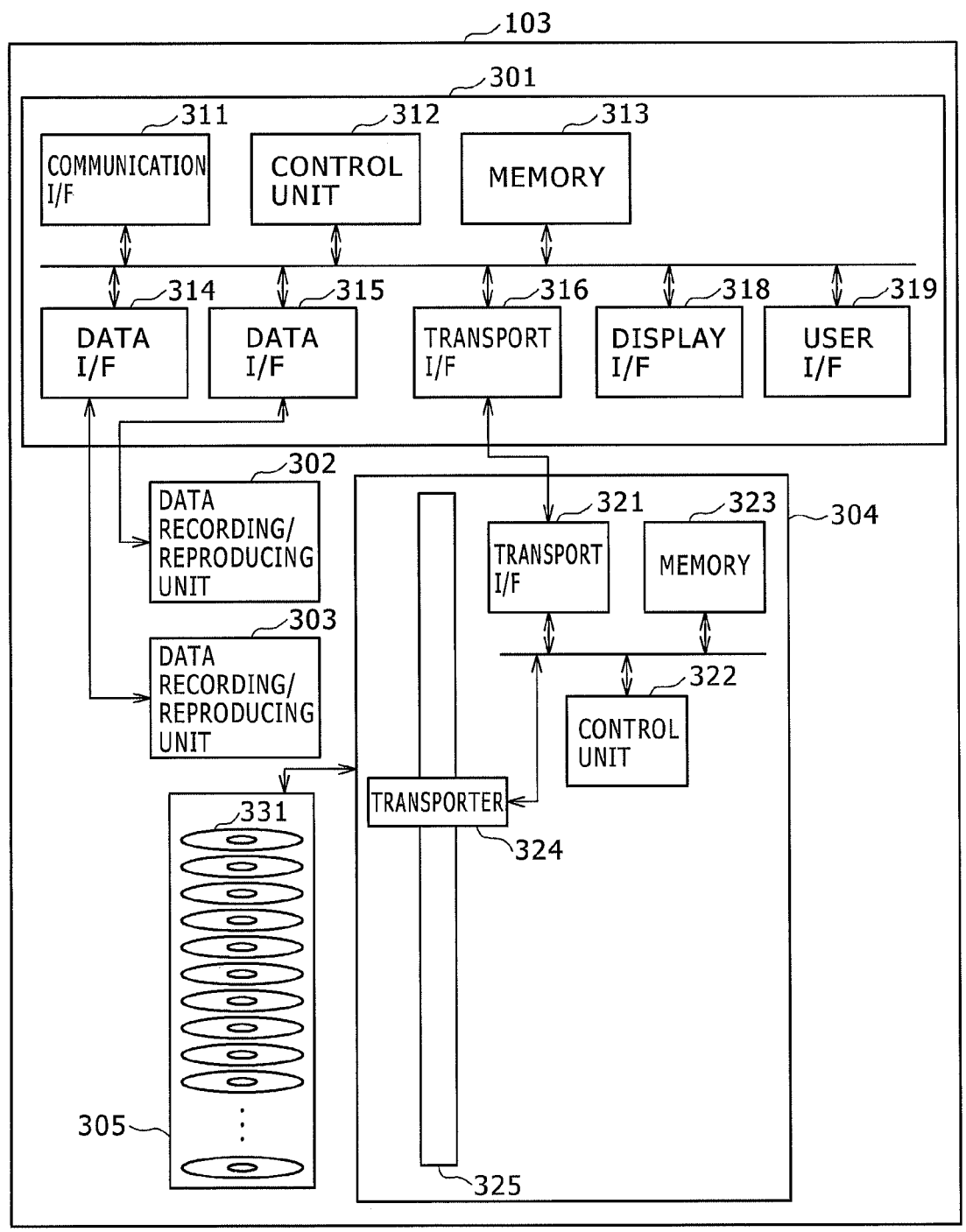
FIG. 3 is a block diagram illustrating a configuration example of a library device.

FIG. 3 is a block diagram illustrating a configuration example of the library device 103 according to this embodiment.

The library devices 104 and 105 have the same configuration as that of the library device 103. The library device 103 includes a library control unit 301, data recording/reproducing units 302, 303, a recording medium transport unit 304, and a recording medium storage unit 305. Reference numeral 331 denotes recording media which are stored in the recording medium storage unit 305. For example, the recording media 331 is BD-R (Blu-Ray disc recordable) or a hologram disc.

The library control unit 301 receives "library control command" from the archive management device 101, transmits the "device control command" to the data recording/reproducing units 302, 303, and the recording medium transport unit 304 for control, and executes processing required by the archive management device 101. In this example, the "device control command" represents various control commands to be transmitted by the library control unit 301 to the data recording/reproducing units 302, 303, and the recording medium transport unit 304.

The library control unit 301 includes a communication interface 311, a control unit 312, a memory 313, data interfaces 314, 315, a transport I/F 316, an input/output interface 317, a display interface 318, and a user interface 319.

The communication interface 311 is configured to transmit and receive the "library control command", and the data to be archived or retrieved with respect to the archive management device 101, and controls the data transmission and reception.

The library control unit 301 executes a program for realizing the function of the library device 103, and operates the library device 103. The memory 313 is configured by a volatile memory and a nonvolatile memory. The library control unit 301 stores software such as BIOS necessary to start the library device 103, software for realizing the OS and the function of the library device 103, and information such as a configuration file in the nonvolatile memory. The library control unit 301 temporarily records data necessary for the operation of the software, data recorded on the recording medium, and data read from the recording medium in the volatile memory.

The data interfaces 314 and 315 are configured to conduct a data communication with the data recording/reproducing units 302 and 303. The data interfaces 314 and 315 transmit and receive the "device control command", data to be recorded on the recording medium, and data reproduced and read from the recording medium. The data interfaces 314 and 315 conduct data transfer complying with standards such as an SATA (serial advanced technology attachment).

The transport interface 316 is configured to conduct a data communication with the recording medium transport unit 304. The transport interface 316 transmits and receives the "device control command". The transport interface 316 conducts data transfer complying with standards such as an RS-232 (recommended standard 232).

The display interface 318 is configured to output a log output of the library device 103 to the display device. The user interface 319 is an interface such as a keyboard or a mouse for inputting the user operation.

The display device, the keyboard, or the mouse can be connected to the display interface 207 and the user interface 208 to directly operate the library device 103.

The data recording/reproducing units 302 and 303 each record data on the recording medium according to the "device control command" transmitted from the library control unit 301, and transmit data reproduced and read from the recording medium to the library control unit 301.

The recording medium transport unit 304 includes a transport interface 321, a control unit 322, a memory 323, a transporter 324, and a rail 325.

The transport interface 321 is configured to conduct a data communication with the library control unit 301. The transport interface 321 transmits and receives the "device control command". The transport interface 321 conducts data transfer complying with the standards such as RS-232 (recommended standard 232).

The control unit 322 controls the recording medium transport unit 304. The control unit 322 drives the transporter 324 according to the "device control command" transmitted from the library control unit 301, and extracts and transports the recording medium from a given position of the recording medium storage unit 305. The control unit 322 loads the recording medium into the data recording/reproducing unit, ejects the recording medium from the data recording/reproducing unit, and returns the recording medium to the given position of the recording medium storage unit 305. Also, the control unit 322 records storage position information of the respective recording media in the recording medium storage unit 305, and information on the present position of the recording medium in the memory 323 for management.

The memory 323 is configured by a volatile memory and a nonvolatile memory. The memory 323 stores software for realizing the function of the recording medium transport unit 304, and information on the storage position information on the recording media in the nonvolatile memory. The memory 323 temporarily records data necessary for the operation of the software, data to be recorded on the recording medium, and data read from the recording medium in the volatile memory.

The transporter 324 travels on the rail 325, and transport the recording media under the control of the control unit 322.

The recording medium storage unit 305 is a cartridge for storing the recording media, and can store a large number of recording media such as 500 recording media therein. The recording medium storage unit 305 can be detachably attached. After data has been recorded on all of the recording media, the recording media are extracted from each of the library devices together with the recording medium storage unit. Instead, another recording medium storage unit in which unrecorded recording media have been stored can be loaded into the library device.

Figure 4:
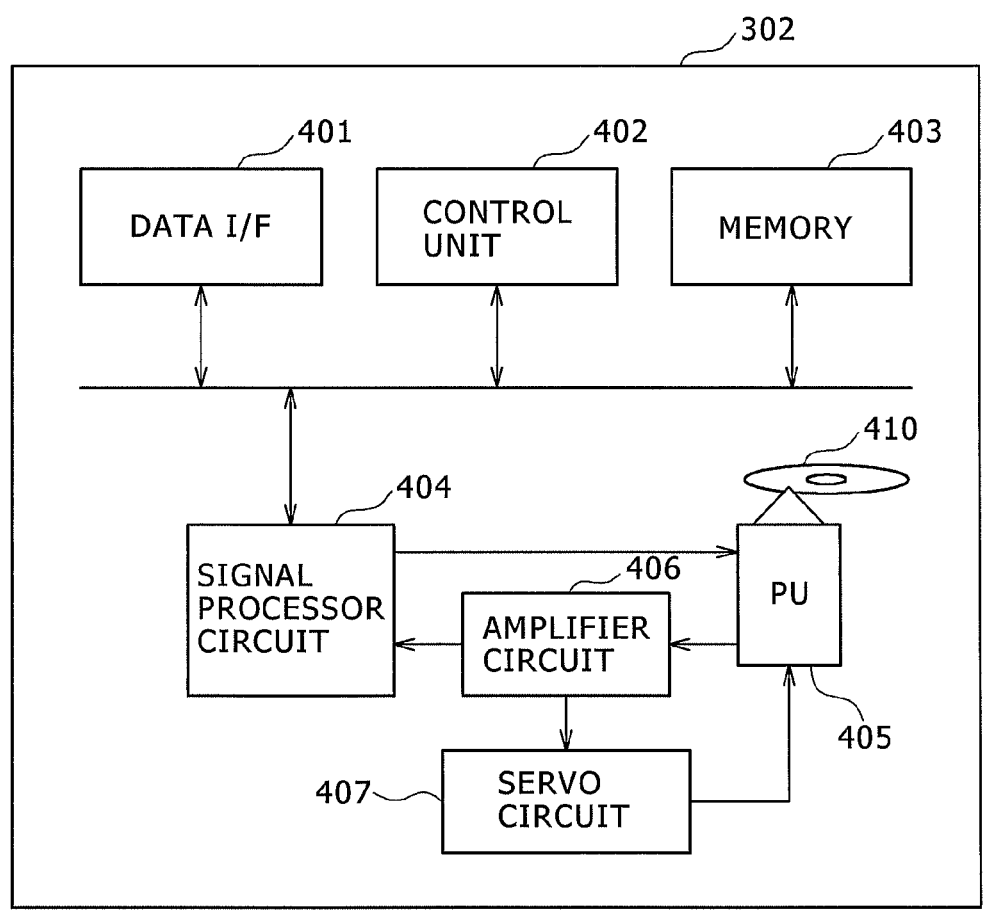
FIG. 4 is a block diagram illustrating a configuration example of a data recording/reproducing unit.

FIG. 4 is a block diagram illustrating a configuration example of the data recording/reproducing unit 302 according to this embodiment.

The data recording/reproducing unit 303 also has the same configuration as that of the data recording/reproducing unit 302.

The data recording/reproducing unit 302 includes a data interface 401, a control unit 402, a memory 403, a signal processor circuit 404, an optical pickup 405, an amplifier circuit 406, and a servo circuit 407.

The data interface 401 is configured to conduct a data communication with the library control unit 301. The data interface 401 transmits and receives the "device control command", data to be recorded on the recording medium, and data reproduced and read from the recording medium. The data interface 401 conduct data transfer complying with standards such as an SATA (serial advanced technology attachment).

The control unit 402 controls a recording process and reproducing process of the data recording/reproducing unit 302.

The memory 403 stores a program for controlling the data recording/reproducing unit, and various configuration information, and medium information acquired from the recording medium therein.

The signal processor circuit 404 decodes an input signal transmitted from the amplifier circuit 406, and outputs data subjected to error correction to the data interface 401. Also, the signal processor circuit 404 conducts signal processing for adding an error correction code to the data transmitted from the data interface 401, modulates the data and outputs to the modulated data to the optical pickup 405.

The optical pickup 405 reads the signal from a recording medium 410, and transmits the signal to the amplifier circuit 406. Also, the optical pickup 405 records a modulated signal transmitted from the signal processor circuit 404 on the recording medium 410.

The amplifier circuit 406 amplifies a reproduced signal read from the recording medium 410 through the optical pickup 405, and transmits the amplified signal to the signal processor circuit 404. Also, the amplifier circuit 406 generates a servo signal, and transmits the servo signal to the servo circuit 407. The amplifier circuit 406 is implemented by, for example, an AFE (analog front end).

The servo circuit 407 controls the optical pickup 405 according to the servo signal generated by the amplifier circuit 406, and an instruction from the control unit 402.

Subsequently, archive and retrieval processing according to this embodiment will be described in detail.

The archive and the retrieval start upon receiving control requests such as "archive request" or "retrieval request" from the client system 1. Those control commands are received by the archive management device 101.

Figure 5:
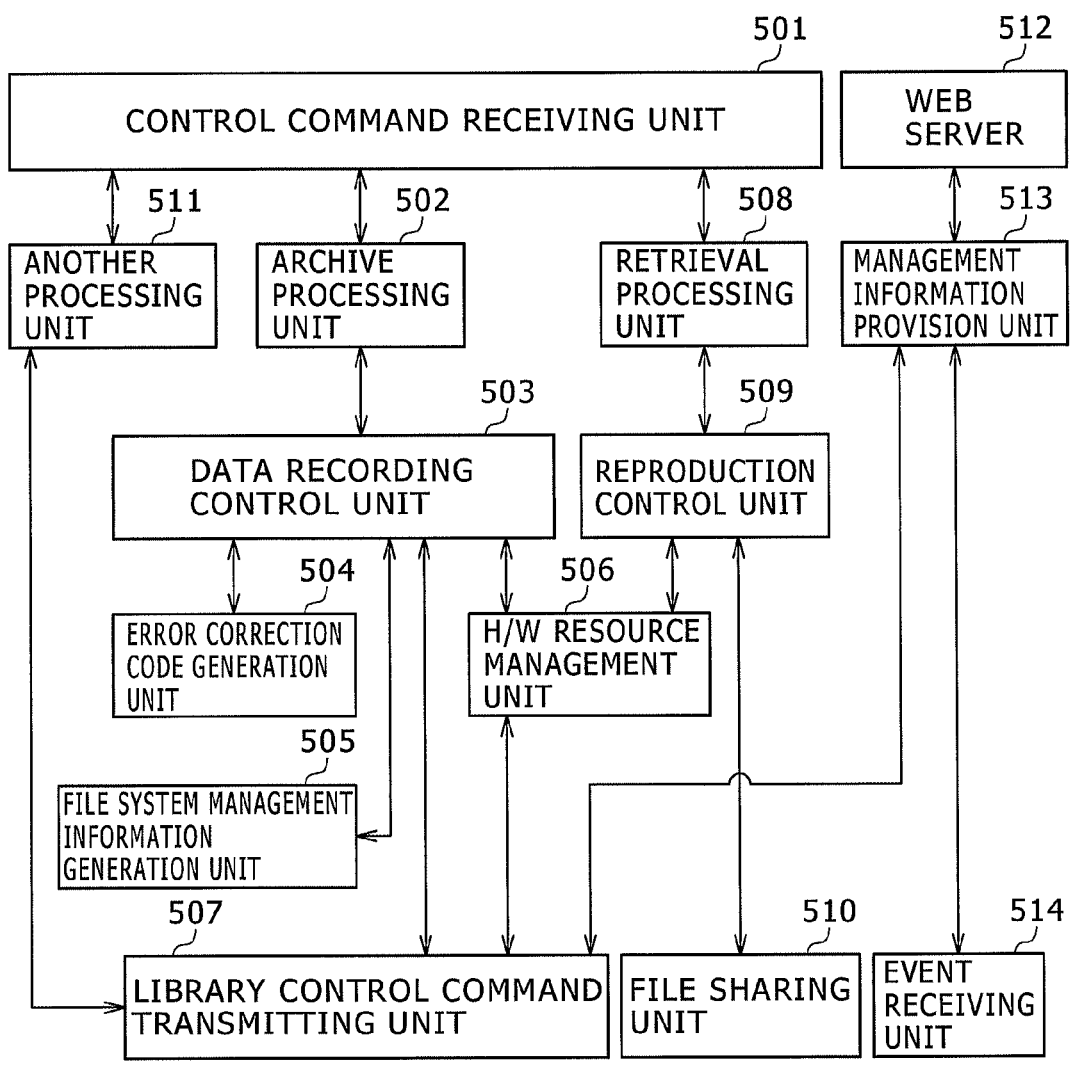
FIG. 5 is a diagram illustrating a software configuration example of the archive management device.

FIG. 5 illustrates a software configuration example of the archive management device 101. The software of FIG. 5 is executed by the control unit 203.

A control command receiving unit 501 receives the control command from the client system 1 through the second communication interface 202, and transmits a control command reception response and a control command execution result response to the client system 1. The received control command is transmitted to the respective command processing units, and processed. The control command reception response indicates that the archive device 2 has received the control command. The control command receiving unit 501 generates and transmits the control command reception response when receiving the control command.

The control command execution result is a response for indicating the results obtained by executing the command. Upon receiving the execution results from the respective command processing units, the control command receiving unit 501 generates and transmits the control command execution result response. The "archive request" is transmitted to an archive processing unit 502, and processed. The "retrieval request" is transmitted to a retrieval processing unit 508, and processed. The other control commands are transmitted to another processing unit 511, and processed.

The archive processing unit 502 is configured to receive the "archive request" and execute the archive processing. The archive processing unit 502 acquires a file of archive requested from the client system 1, and stores the file in the recording/reproducing device 102. The archive processing unit 502 selects one or more files to be recorded on the recording medium from the stored files according to a recording capacity of the recording medium, and requests a data recording control unit 503 to execute recording of data. Also, if a file size is larger than a recording capacity of the recording medium, the file is divided into a plurality of pieces, and recorded. The archive processing unit 502 manages an input/output buffer, an error correction code buffer, a data transmission buffer, and a file system management information buffer as a memory area for archive processing.

The data recording control unit 503 conducts a process of recording the file designated by the archive processing unit 502 on the recording medium. In recording, the data recording control unit 503 conducts (1) the selection of hardware (H/W) resources such as the library devices or the recording/reproducing units for executing the recording operation, and recording medium, (2) the generation of management information for recording the files in a format complying with the file system applied to the recording medium, and (3) the generation of the error correction code that enhances the reliability of the recording data, to generate a data block recorded on the recording medium. Then, the data recording control unit 503 transmits the recording command to the library devices through a library control command transmitting unit 507. The data block is a lump of data that can be processed by one recording command. The processing of (1) is executed by a hardware (H/W) resource management unit 506, the processing of (2) is executed by a file system management information generation unit 505, and the processing of (3) is executed by an error correction code generation unit 504.

The error correction code generation unit 504 generates an error correction code (parity). The error correction code generation unit 504 reads data from an input/output buffer, generates the error correction code, and records the generation results in the error correction code buffer. The data stored in the input/output buffer is controlled by the data recording control unit 503.

The file system management information generation unit 505 generates the file system management information complying with the file format applied to the recording medium. The file format applied to the recording medium is, for example, UDF (universal disk format) 2.5 standards for Blu-Ray. The generated file system management information is recorded in the file system management information.

The hardware (H/W) resource management unit 506 manages the H/W resources of the library device, and transmits the library control command to the library device to control the travel of the recording medium. The hardware (H/W) resource management unit 506 collects information on the operating state of each library device, a connection state and a usage state of the respective elements (library control unit, data recording/reproducing unit, recording medium transport unit, and recording medium storage unit) configuring the library device, and a storage position and a recording state (recorded, unused, defective) of the recording medium stored in the recording medium storage unit. Then, the hardware (H/W) resource management unit 506 records the information in a hardware resource management table. The hardware resource management table is stored in the hard disk drive (HDD) 205 or the recording/reproducing device 102. In archiving, the hardware (H/W) resource management unit 506 selects the library device for executing the recording operation, the recording/reproducing unit used for recording medium, and the recording medium on which data is recorded in response to a request from the data recording control unit 503. The hardware (H/W) resource management unit 506 transmits the library control command to the selected library device, and loads the recording medium into the recording/reproducing unit. In retrieval, the hardware (H/W) resource management unit 506 refers to the hardware resource management table, and acquires information (identifier of the recording medium, identifier of the library device in which the recording medium is stored, storage position in the recording medium storage unit 305) on the recording medium on which the designated file has been recorded. Then, the hardware (H/W) resource management unit 506 transmits the library control command to the library device in which the recording medium is stored, and loads the recording medium in the recording/reproducing unit.

The library control command transmitting unit 507 transmits the library control command to the library device through the communication interface (I/F) 201 in response to a request from the respective processing units. Also, the library control command transmitting unit 507 receives a response to the transmitted library control command, and delivers the response to the respective processing units that have requested the transmission of the library control command.

The retrieval processing unit 508 is configured to receive the "retrieval request", and execute the retrieval processing. The retrieval processing unit 508 requests a reproduction control unit 509 to execute the acquisition of the file of the retrieval requested from the client system 1.

The reproduction control unit 509 conducts a process of acquiring the file designated by the retrieval processing unit 508 from the recording medium. The reproduction control unit 509 acquires the information on the recording medium on which the file designated from the hardware (H/W) resource management unit 506 has been recorded, and the library device that stores that recording medium therein, and reproduces the recording medium. Then, the reproduction control unit 509 requests a file sharing unit 510 to set file sharing, and reads the file recorded on the recording medium of the library device from the client system 1.

The file sharing unit 510 sets the file sharing through the network so as to use the file recorded on the recording medium of the library device from the client system 1. The file sharing unit 510 acquires data of the file subjected to "retrieval request" from the library device through the communication interface 201, and transmits the acquired data to the client system through the second communication interface 202.

The another processing unit 511 receives the control requests other than the "archive request" and the "retrieval request". The control requests are, for example, "power off", "restart", "H/W diagnosis", "software (S/W) update", and "state information acquisition". For each command, the another processing unit 511 transmits the library control command to the library device through the library control command transmitting unit 507, and appropriately controls the devices (archive management device, library devices, recording/reproducing device) configuring the archive device 2.

A web server 512 provides information related to the archive device 2 through the second communication interface 202. The web server 512 transmits information in a format of an HTML (hypertext markup language) document or an image file in response to a request of the software from the client system 1 such as a web browser. The HTML document that provides information related to the archive device 2 is generated in a management information provision unit 513.

The management information provision unit 513 collects and manages information on the operating stage of the overall archive device 2, and provides an archive device management GUI (graphical user interface) of the format that can be browsed by the web browser. The archive device management GUI is generated in the format of the HTML document. The information related to the library device is collected by transmitting the library control command that acquires the state information. Also, the management information provision unit 513 receives an event from the library device through an event receiving unit 514, and collects information on a state change or an abnormal state generation. The state change is, for example, replacement of the recording medium storage unit. The abnormal state generation is, for example, a failure of the recording medium transport unit, and an abnormal temperature of the library device.

The event receiving unit 514 receives an event notice from the library device through the communication interface 201, and delivers the event notice to the management information provision unit 513.

Hereinafter, an example of the optical disc as the recording medium will be described.

Figure 6:
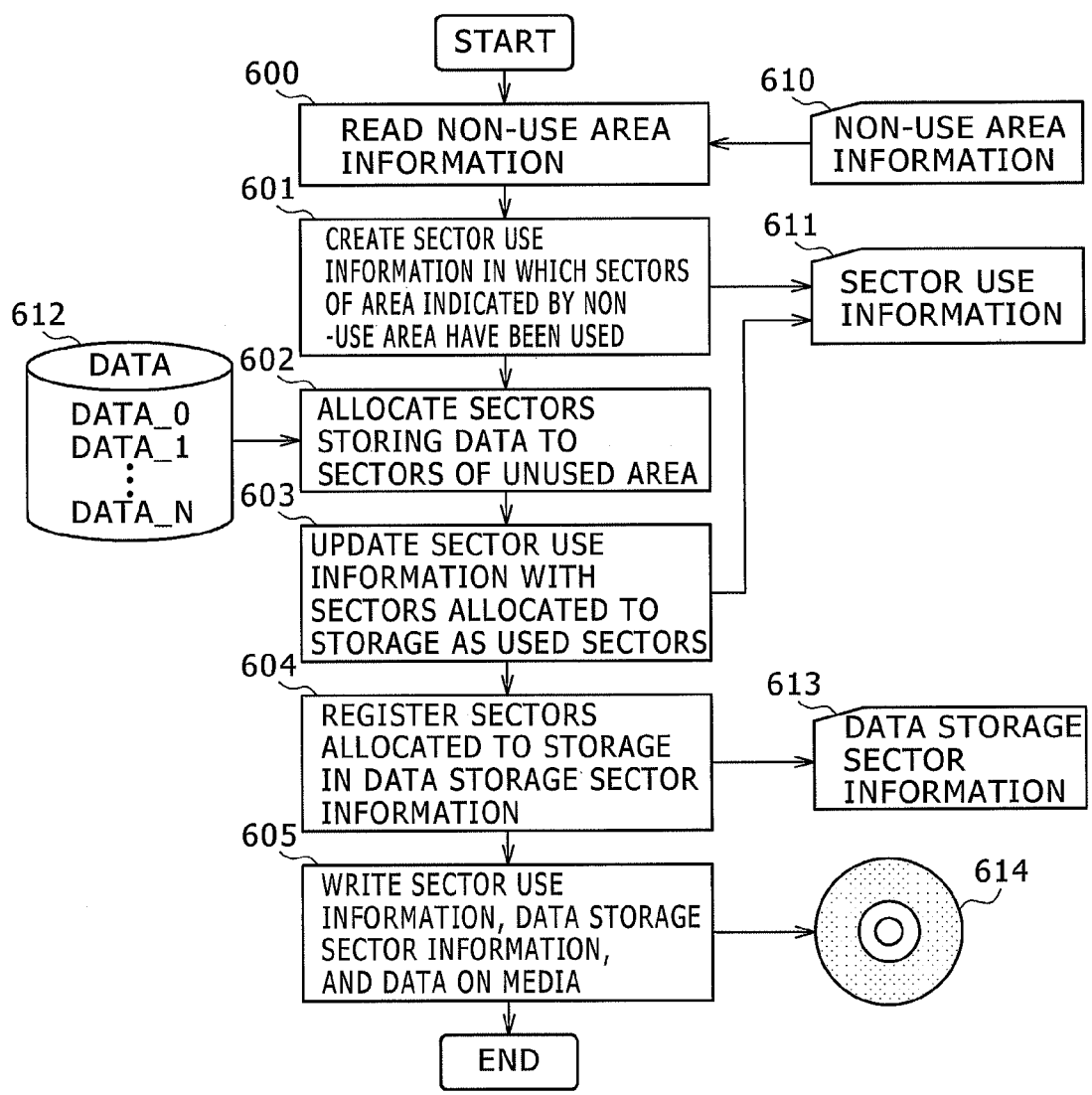
FIG. 6 is an exemplary flowchart of processing for indicating an area in which no data is recorded with the use of non-use area information, and recording data in an optical disc.

FIG. 6 illustrates a processing flow when an outer peripheral portion of the optical disc is designated as a non-use area not used in a recording area of data, and data is recorded on the optical disc. The control unit 203 in FIG. 2 executes this processing flow.

Figures 7, 8:
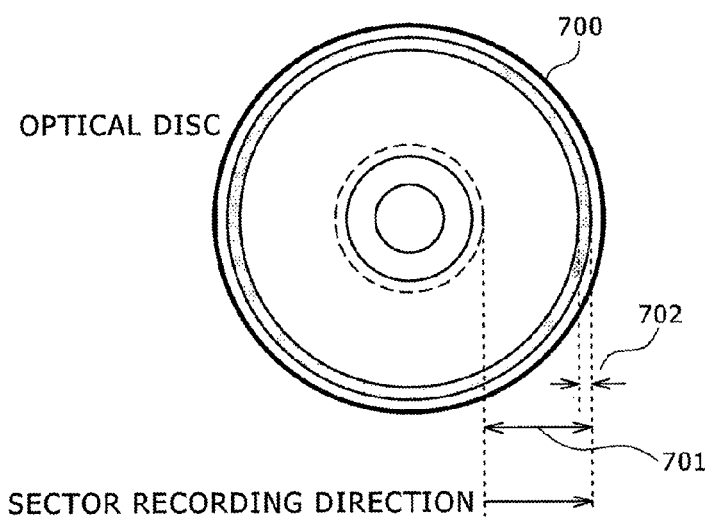
FIG. 7 is a diagram illustrating an area where data is recorded in the optical disc.
FIG. 8 is a diagram illustrating an example of the non-use area information for indicating a sector not used for write when data is written into the optical disc on a sector basis.

FIG. 7 illustrates a data configuration example of the optical disc on which data is written in FIG. 6. An optical disc 700 has one recording layer on which data can be recorded, and enables data recording in a block unit called "sector" of a 2048-byte unit. The data volume that can be recorded on one recording layer is 25 G bytes, and has 12500000 sectors in managed sector equivalent. An area 701 is an area in which all sectors of the optical disc are arranged, and data is written from an inner periphery thereof toward an outer periphery, and sector Nos. allocated to the sectors to be managed are also increased in value from the inner periphery toward the outer periphery. Also, an area 702 represents an area in which no data is recorded in the first embodiment, and has 500000 in the number of sectors, and corresponds to 1 GB in capacity equivalent.

FIG. 8 illustrates the non-use area information for indicating an area portion indicated by the area 702 by sector No. "1" indicated by the number of area 800 represents that one area is shown as a non-use area. A start sector No. 801 indicates a start No. of the sector not used for writing data, and an end sector No. 802 indicates an end No. of the sector not used for writing. Sectors between the start sector No. 801 and the end sector No. 802 indicated by the non-use area information in FIG. 8 indicates the area 702 in FIG. 7.

A recording control procedure that does not write data in the area 702 of the optical disc 700 with the use of the non-use area information in FIG. 8 will be described with reference to the processing flow of FIG. 6.

In Step 600, the non-use area information of FIG. 8 is read as non-use area information 610. In the non-use area information of FIG. 8, one area is described by the sector No. as the non-use area, which represents information that the sectors between sector Nos. 12000000 and 12499999 are an area not used for writing data.

In Step 601, the sectors indicated by the non-use area information in FIG. 8 which is read in Step 600 are registered in sector use information 611 as the used sectors.

Figure 9:
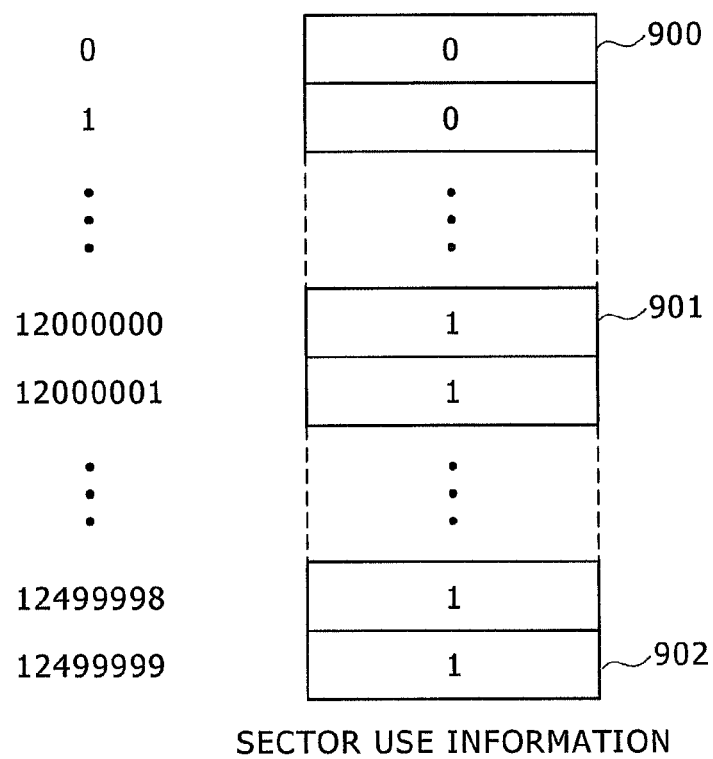
FIG. 9 is a diagram illustrating an example of sector use information for managing unused/used sectors when data is written into the optical disc on the sector basis.

FIG. 9 illustrates an example of the sector use information 611. The sector use information 611 is information for managing a free status of all the sectors of the optical disc 700, or the respective sectors that can be handled by the file system. For example, when the optical disc 700 has the sectors to which sector Nos. 0 to 12499999 are allocated, the sector use information 611 sets "0 (free state)" as the non-use sector for a sector 900 of the sector No. 0 where no data is written, and no data is allocated. Also, when arbitrary data is allocated to the sector, and the sector is used for writing data, the sector use information 611 changes the setting to "1 (use state)".

In Step 601, because the area indicated by the non-use area information in FIG. 8 is registered as the used sector, a sector 901 of sector No. 12000000 to a sector 902 of sector No. 12499999 are set to "1".

In Step 602, in order to write named data such as DATA_0 and DATA_1 from data 612 on the optical disc, the non-use sectors (that is, "0 "free state") are extracted with reference to the sector use information 611, and the number of sectors necessary for storing DATA_0 and DATA_1 is allocated. Then, in Step 603, the used "1" is registered in the allocated sector Nos., and the sector use information 611 is updated.

In Step 604, information on the sectors allocated to DATA_0 and DATA_1 of the data 612 is registered in DATA storage sector information 613.

Figure 10:
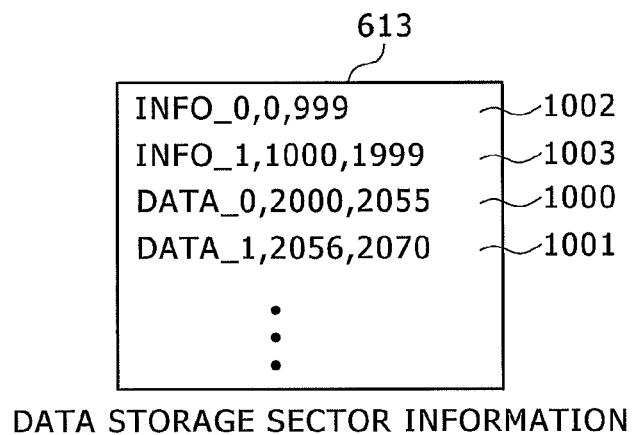
FIG. 10 is a diagram illustrating an example of DATA storage sector information indicative of sector use information on data written in the optical disc.

FIG. 10 illustrates the DATA storage sector information 613. In sector information 1001, sectors of sector Nos. 2000 to 2055 are allocated to DATA_0, and sectors of sector Nos. 2056 to 2070 are allocated to DATA_1.

In Step 605, a process of recording data to which the sectors have been allocated in the DATA storage sector information 613 on an optical disc 614 is conducted according to the sector use information 611, the DATA storage sector information 613, and the data 612. The sector use information 611 and the DATA storage sector information 613 are parts of the management information on the data to be written into the optical disc. The sector use information 611 is stored in an area indicated by sector area 602, and the DATA storage sector information 613 is stored in an area indicated by sector information 1003.

With the execution of the above-mentioned processing flow illustrated in FIG. 6, before the sectors of the unused area are allocated to data for recording data of the data 612 on the optical disc 614, information on the non-use area information 610 is registered as the used sectors in the sector use information 611. Therefore, the area in which the data 612 is recorded is not allocated to the area indicated by the non-use area. In the first embodiment, data storage into the area 702 which is the outer periphery of the optical disc is avoided. As a result, even if the area 702 portion of the optical disc is damaged or dirty, no data is lost, and a retentive property of the recorded data 612 is enhanced.

In this example, as the non-use area information 610 in Step 600, there are assumed a method of configuring a value predetermined according to the type of the optical disc or the reliability requested by the system, a method of arbitrary inputting the non-use area information 610 by a user, and a method of configuring the non-use area information 610 from another software or another system. The types of the optical disc include, for example, a BD-SL (signal layer) having one recording layer, a BD-DL (dual layer) having two recording layers, and a DB-TL (triple layer) having three recording layers.

In the above description, the data volume that can be recorded on one recording layer is 25 GB, but the data volume is not limited to 25 GB.

Also, the size of the sector can be changed according to the size dealt with by the file system applied to the optical disc to be used, and is not limited to 2048 bytes.

As described above, in the optical disc having only one recording layer, because the data to be recorded is recorded from the inner periphery toward the outer periphery, if data of the volume smaller than the data volume that can be recorded on the optical disc is written, data is not recorded in the outer periphery. However, in recent years, the optical disc has a plurality of recording layers for the purpose of increasing the recording volume. For example, even in the optical disc of a structure having three recording layers such as BD-TL, the method of the first embodiment according to the present invention can be effectively utilized, which will be described below.

Even in the following description, the data volume that can be recorded on one recording layer is 25 GB, but the data volume is not limited to 25 GB. In fact, BD-TL whose data volume per one recording layer is about 33 GB has been developed.

Figure 11:
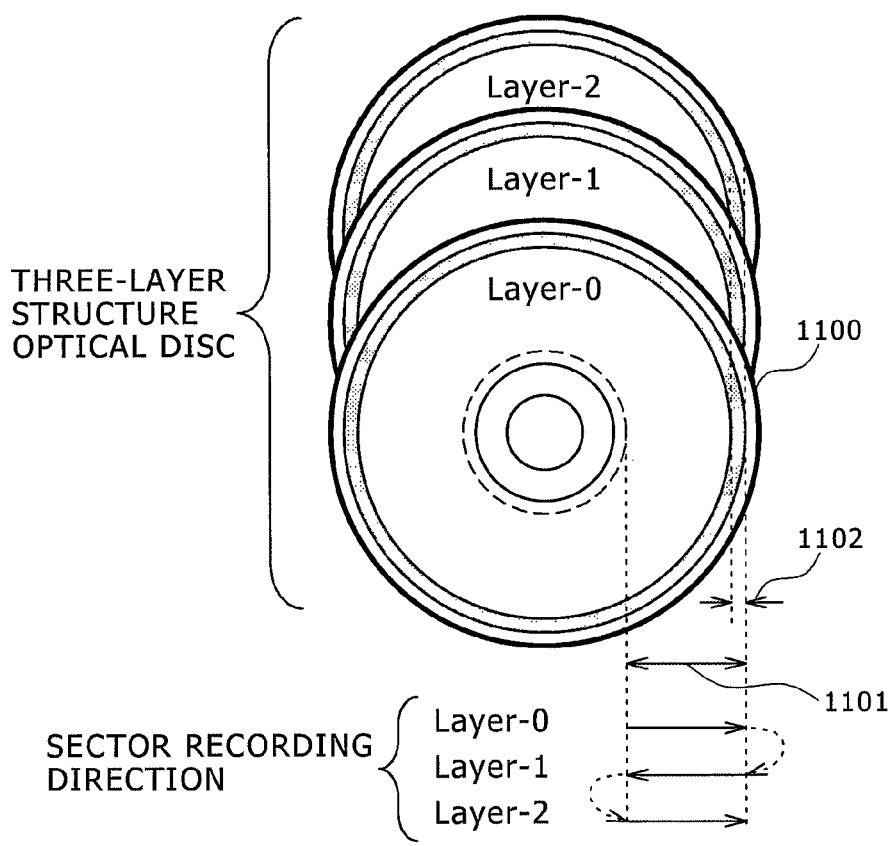
FIG. 11 is a diagram illustrating an area where data is recorded in the optical disc having three recording layers.

FIG. 11 illustrates an example of a data configuration of the optical disc on which data is written. An optical disc 1100 has a three-layer structure in which three recording layers on which data can be recorded are stacked on each other. Data of 25 G bytes can be recorded on a first recording layer of Layer-0, and second and third recording layers also have the same recording area. A direction of writing data in the sectors is from the inner periphery toward the outer periphery in the first layer of the Layer-0, from the outer periphery toward the inner periphery in the second layer of Layer-1, and from the inner periphery toward the outer periphery in the third layer of Layer-2. The sectors in which data can be recorded are arranged in an area 1101 of each layer, and when an area 1102 of the outer periphery is configured as an area in which no data is recorded, the non-use area information is configured as illustrated in FIG. 12.

The non-use area information in FIG. 12 will be described. The reason that a value of the number of areas 1200 is "3" is because the area 1102 in which data is not recorded is one area, but since the optical disc 1100 has a three-layer structure, three area configurations are conducted as the configuration of the respective recording layers. A start sector 1201 of sector No. 12000000 to an end sector 1202 of sector No. 12499999 are area designation in the recording layer of Layer-0. A start sector 1203 of sector No. 12500000 to an end sector 1204 of sector No. 12999999 are area designation in the recording layer of Layer-1. A start sector 1205 of sector No. 37000000 to an end sector 1206 of sector No. 37499999 are area designation in the recording layer of Layer-2. Because the start sector 1201 to the end sector 1204 are sectors of serial numbers, those sectors may be described as one area without any problem.

A case in which data is rewritten on the optical disc 1100 with the use of the non-use area information in FIG. 12 will be described in brief with reference to the processing flow of FIG. 6 described above.

In Step 600, data of FIG. 12 is read as the non-use area information 610.

In Step 601, "1" is registered in the sector use information 611 as the used sector on the basis of the non-use area information 610 read in Step 600.

In Step 602, a lot of data can be stored as compared with the optical disc of one hierarchy. However, because a portion of the used sectors described in the non-use area information is present in the area 1102 extended from Layer-0 to Layer-1 in the vicinity of the outer periphery, one piece of data may be arranged in the sector extended over the non-use area.

In Step 603, "1" is registered in the sector No. allocated to data as the used sector, and the sector use information 611 is updated.

In Step 604, information on the sector allocated to the data within the data 612 is registered in the DATA storage sector information 613. An example in which data is divided and registered in the sectors according to the non-use area information of FIG. 12 will be described with reference to DATA storage sector information 1300 in FIG. 13.

In Step 602, in allocating data of the data 612 to the sectors of the optical disc, when data arrives at sector No. 12000000 instructed by the start sector 1201 of the non-use area information in FIG. 12, since the arrival area is registered as the used sector in the sector use information 611, data is allocated to the unused area with the avoidance of that area.

For example, it is assumed that DATA_777 of the data 612 is data consuming 15 sectors. When allocation starts from sector No. 11999995, five sectors to sector No. 11999999 are first allocated to data. Since sector No. 12000000 of the start sector 1201 to sector No. 12999999 of the end sector 1204 have been used, those sectors are not allocated. Sector No. 13000000 to sector No. 13000009 are additionally allocated as the remaining ten sectors. Information on the allocated results is registered in the DATA storage sector information 1300 of FIG. 13.

Figure 13:
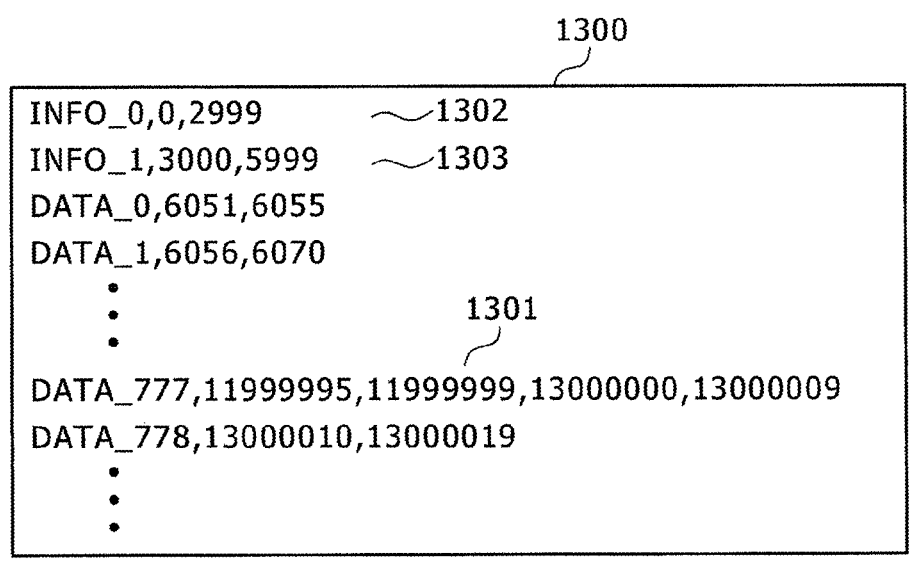
FIG. 13 is a diagram illustrating an example of DATA storage sector information indicative of the sector use information on data written in the optical disc.

It is found that in the DATA storage sector information 1300 of FIG. 13, the sectors where the sectors of the non-use area information illustrated in FIG. 12 are avoided are registered in the DATA_777 of the sector information 1301.

In Step 605, a process of recording data to which the sectors have been allocated by the DATA storage sector information 1300 on the optical disc 614 is conducted according to the sector use information 611, the DATA storage sector information 1300 of FIG. 13, and the data 612. The sector use information 611 and the DATA storage sector information 613 are management information on data to be written on the optical disc. The sector use information 611 is stored in the sector information 1302, and the DATA storage sector information 1300 is stored in an area indicated by sector information 1303.

When the above processing flow illustrated in FIG. 6 is executed on the optical disc 1100 of the three-layer structure in FIG. 11 with the use of the non-use area information in FIG. 12, because data of the data 612 is arranged according to data indicated by the DATA storage sector information 1300 in FIG. 13, a control for avoiding recording of data in the area 1102 portion can be conducted even on the recording layer of a different hierarchy.

According to the first embodiment described above, since the data recording in a specific area can be avoided with the use of the non-use area information even if the general-purpose recording optical disc is used, a data recording method taking the management status after data has been recorded on the media into account can be applied, and can help a long-period storage management of the recorded data.

Also, in the first embodiment, a case using the optical disc has been described. However, the method of controlling the data recording using the non-use area does not need to specify the media to be recorded. For example, if an area not to be recorded in recording characteristic or operation management after recording is present even in the recording media such as a holographic memory, that area is designated as the non-use area, and this control is conducted whereby data recording can be avoided.

Also, in the processing flow when data is recorded on the optical disc, the control unit 203 of FIG. 2 executes this processing flow. As a modification, the same advantages are obtained even if the control unit 312 of FIG. 3 in the configuration of only the archive device, and the control unit 402 of FIG. 4 in the configuration of only the data recording/reproducing unit implement this processing flow.

Second Embodiment

The first embodiment assumes the first data write into the optical disc of the recordable type that enables write once, or the rewritable type that enables rewrite. On the contrary, in a second embodiment, a description will be given of processing in which in even second and subsequent write of the rewritable type that enables rewrite, the first data recording control effectively functions, data write into the non-use area is avoided, and the non-use area can be configured later.

Figure 14:
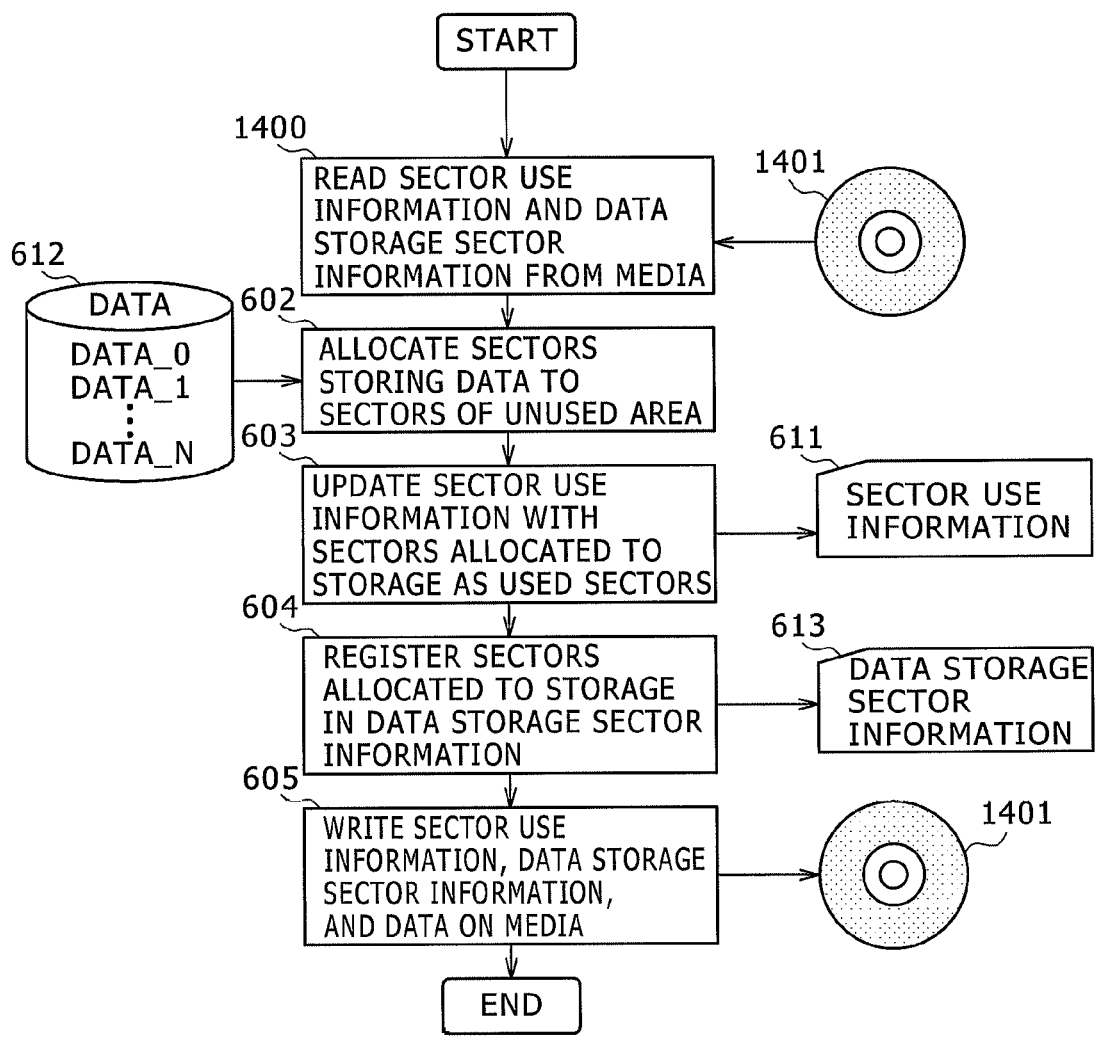
FIG. 14 is an exemplary flowchart illustrating processing when recording data on a rewritable optical disc.

FIG. 14 illustrates a processing flow when data is additionally recorded on the rewritable optical disc that enables rewrite according to the second embodiment of the present invention. In the processing flow of FIG. 6 used in the first embodiment, Step 600 and Step 601 are replaced with Step 1400, and the sector use information 611 and the DATA storage sector information 613 are read from a rewritable optical disc 1401, and processed. The processing will be described with reference to the processing flow of FIG. 14.

In Step 1400, the sector use information 611 and the DATA storage sector information 613 are read from, for example, the rewritable optical disc 1401 created in the first embodiment.

The processing subsequent to Step 602 is identical with the processing described in the first embodiment. Since the contents of the non-use area information have already been registered as "1" of the used sector in the read sector use information 611 at the time of the first data write into the optical disc 1401, data is not written in the area configured as the non-use area so far as data is additionally recorded in the non-use sector. Therefore, if the control method using the non-use area information 610 at the time of the first data write is used, data write into the non-use area can be avoided even in the subsequent data recording.

Figure 15:
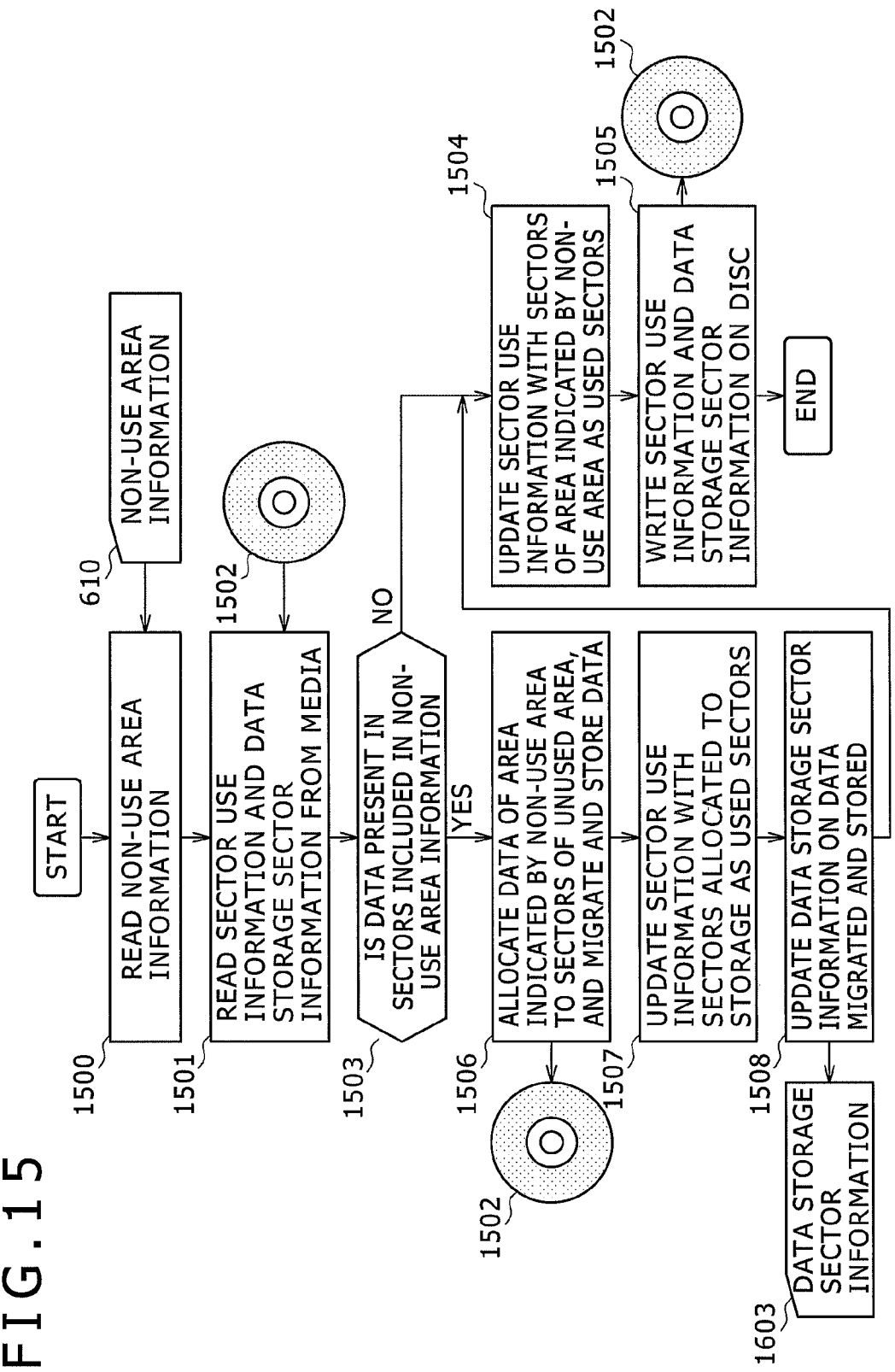
FIG. 15 is an exemplary flowchart illustrating processing when adding a non-use area to the rewritable optical disc with the use of the non-use area information.

Also, a processing flow in which the non-use area can be created in the optical disc where the processing of the non-use area information 610 is not conducted at the time of the first data write, with the use of the non-use area information 610 at the time of the second and subsequent data write will be described with reference to FIG. 15.

In Step 1500, data of the non-use area information in FIG. 12 is read as the non-use area information 610.

In Step 1501, the sector use information 611 and the DATA storage sector information 613 are read from an optical disc 1502 created without conducting the non-use area processing, with the use of the non-use area information 610 used in the first embodiment.

In Step 1503, it is checked whether the sectors used for data recording described in the DATA storage sector information 613 read from the optical disc 1502 in Step 1501 include the sectors described in the non-use area information 610 of FIG. 12 which is read in Step 1500, or not. The flow proceeds to Step 1504 if the sectors are not used for data recording, and the flow proceeds to Step 1506 if the sectors are used for data recording.

In Step 1504, "1" indicative of the used sector in the sector use information 611 is registered in the sector instructed by the read non-use area information 610 of FIG. 7.

In Step 1505, the sector use information 611 and the DATA storage sector information 613 are written on the optical disc 1502.

In Step 1506, since data is stored in the sectors instructed by the non-use area information 610, data of the sectors recorded in the non-use area is allocated to the sectors of the non-use area, and data is migrated and written on the optical disc 1502.

In Step 1507, "1" indicative of the used sector in the sector use information 611 is registered in the non-use sector used in Step 1506.

In Step 1508, the DATA storage sector information reflecting the result of data migration conducted in Steps 1506 and 1507 is created, and the DATA storage sector information read from the optical disc 1502 in Step 1501 is updated. An example of the update contents of the DATA storage sector information at that time will be described with reference to FIG. 16.

Figure 16:
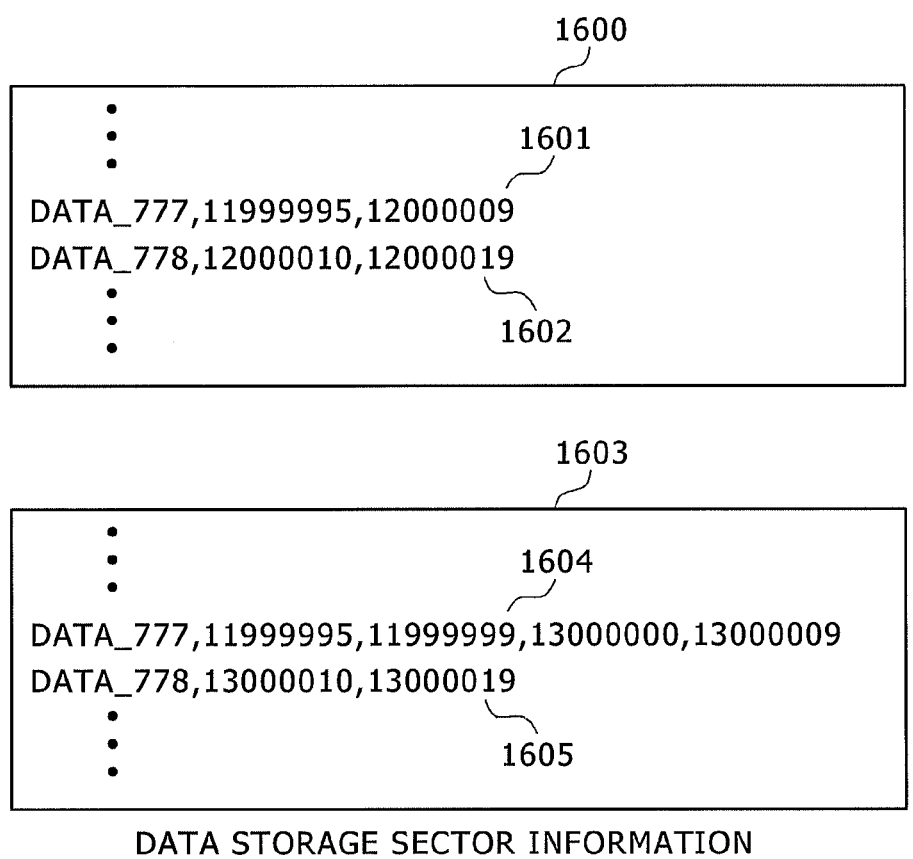
FIG. 16 is a diagram illustrating an example of a change in the DATA storage sector information when a data recording sector is changed by addition of the non-use area.

DATA storage sector information 1600 in FIG. 16 is read from the optical disc 1502. DATA storage sector information 1601 (sector Nos. 11999995 to 12000009) and DATA storage sector information 1602 (sector Nos. 12000010 to 12000019) have a portion (sector Nos. 12000000 to 12000009, 12000010 to 12000019) overlapping with the sector Nos. of the start sector 1201 to the end sector 1202 (sector No. 12000000 to sector No. 12499999) which is one of the non-use area indicated by the non-use area information 610 of FIG. 7 which is read in Step 1500.

In Step 1506, the sectors used in the storage of data within the non-use area are allocated to other non-use sectors, and the result of migrating data becomes DATA storage sector information 1603. In the sector information 1604, the sectors used for storing data between the start sector 1201 and the end sector 1204 which are the non-use area are migrated to the sectors subsequent to the end sector 1204. Therefore, data is divided and registered. Also, in the sector information 1605, data is migrated to the sectors subsequent to the sectors used in the sector information 1504 because data of the sector information 1602 also uses the non-use area.

After the sector use information and the DATA storage sector information have been updated in Steps 1507 and 1508, a process of registering "1" indicative of the used sectors in the sector use information is conducted on the sectors instructed by the non-use area information of FIG. 12 which is read in the above Step 1504. A process of writing the sector use information and the DATA storage sector information on the optical disc 1502 is conducted in Step 1505.

The optical disc 1502 in which the sector use information and the DATA storage sector information have been updated in Step 1505 can avoid recording of data in the non-use area when data is recorded with the use of the above-mentioned processing flow of FIG. 14.

According to the second embodiment described above, if the processing according to the present invention in which the non-use area is configured in the first data write on the optical disc, the data recording into the non-use area is avoided even at the time of the subsequent data recording. Further, even in the optical disc where data has been written without configuring the non-use area, the non-use area can be configured with the use of the processing flow of FIG. 15. Also, in the processing flow of FIG. 15, when the non-use area is expanded more than the non-use area used previously for execution, the optical disc can be recreated to expand the non-use area. As a result, for example, when the quality deterioration of the optical disc is detected when reading the information recorded on the optical disc, the size of the non-use area configured up to now can be increased, and the reliability of information can be enhanced.

The respective embodiments of the present invention have been described above. However, the present invention includes various modifications without departing from the subject matter of the present invention. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

As a modification 1, there is provided a data recording/reproducing device for recording data on a recordable area of a recording medium in an arbitrary recording unit, including: a control unit that controls the operation of the data recording/reproducing device, in which the control unit designates a recording unit where data on the recordable area is not recorded as a non-use area, determines whether data has been recorded, or unrecorded in the recording unit on the recordable area, determines the recording unit designated as the non-use area to have been recorded, and records data in the recording unit determined to be unrecorded when data is recorded on the recording medium, under the control.

As a modification 2, there is provided the data recording/reproducing device according to the modification 1, in which the designation of the non-use area, and the determination of whether data has been recorded, or unrecorded in the recording unit are executed before data is recorded on the recording medium.

As a modification 3, there is provided the data recording/reproducing device according to the modification 1, in which the recording medium is a rewritable medium, and data has already been recorded on the recording medium, and when the data has been recorded in the recording unit designated as the non-use area, the control unit controls data recorded in the recording unit designated as the non-use area to be migrated to the recording unit on which the data is determined to be unrecorded, and recorded.

As a modification 4, there is provided the data recording/reproducing device according to any one of the modifications 1 to 3, in which the non-use area is arranged on an outer peripheral side of the recording medium.

As a modification 5, there is provided an archive system including an archive management device, and one or more library devices, in which the archive management device includes an overall control unit that controls the operation of the overall archive system, and issues an operation processing instruction to the library devices, in which each of the library devices includes: a recording medium storage unit that stores one or more recording media therein; a data recording/reproducing unit that records data on the recording media in an arbitrary recording unit; and a library device control unit that controls the operation of the library device on the basis of the operation processing instruction issued from the overall control unit, and in which the overall control unit designates a recording unit where data on the recordable area is not recorded as a non-use area, determines whether data has been recorded, or unrecorded in the recording unit on the recordable area, determines the recording unit designated as the non-use area to have been recorded, and issues an instruction for controlling the data recording/reproducing unit to record data in the recording unit determined to be unrecorded to the library when data is recorded on the recording medium.

As a modification 6, there is provided a recording control method for recording information on a recording medium in an arbitrary recording unit, including the steps of: designating a recording unit where data on the recordable area is not recorded as a non-use area; determining whether data has been recorded, or unrecorded in the recording unit on the recordable area; determining the recording unit designated as the non-use area to have been recorded; and recording data in the recording unit determined to be unrecorded when data is recorded on the recording medium.

As a modification 7, there is provided the recording control method according to the modification 6, in which the designation of the non-use area, and the determination of whether data has been recorded, or unrecorded in the recording unit are executed before data is recorded on the recording medium, in which the recording medium is a rewritable medium, and data has already been recorded in the recording medium, and when the data has been recorded in the recording unit designated as the non-use area, the control unit controls data recorded in the recording unit designated as the non-use area to be migrated to the recording unit on which the data is determined to be unrecorded, and recorded.

As a modification 8, there is provided the recording control method according to the modification 6, in which the recording medium is a rewritable medium, and data has already been recorded on the recording medium, and when the data has been recorded in the recording unit designated as the non-use area, data recorded in the recording unit designated as the non-use area is migrated to the recording unit on which the data is determined to be unrecorded, and recorded.

As a modification 9, there is provided the recording control method according to any one of the modifications 6 to 8, in which the non-use area is arranged on an outer peripheral side of the recording medium.

Also, parts or all of the above-described respective configurations, functions, processors, processing means may be realized, for example, as hardware by being designed by an integrated circuit. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. A library device for managing plural pieces of recording medium which has recordable area consisting of recording units, comprising:
    a control module that controls the operation of a data recording/reproducing device,
    a recording/reproducing module that records data on the recordable area or reproduce data on the recording medium,
    wherein the control module designates a part of the recordable area as a non-use area where data should not be recorded in a recording unit according to a type of the recording medium before recording data on the recording medium which has not been recorded; and
    wherein the control module recognizes the non-use area as a recorded area that have been recorded, and determines whether an area on the recording medium is the recorded area or an unrecorded area that has not been recorded in the recording unit, and controls the recording/reproducing module to record data on an area which is determined as the unrecorded area.

2. The library device according to claim 1,
    wherein the non-use area is arranged on an outer peripheral side of the recording medium.

3. The library device according to claim 1, wherein the type of the recording medium is based on the number of layers of the recording medium.

4. An archive system comprising:
    an archive management device, and one or more library devices,
    wherein the archive management device includes;
    an overall control module that controls the operation of the overall archive system,
    wherein each of the library devices includes;
        a recording medium storage module that stores one or more recording medium which has recordable area consisting of recording units;
        a recording/reproducing module that records data on the recordable area or reproduces data on the recording medium;
    wherein the overall control module designates a part of the recordable area as a non-use area where data should not be recorded in the recording unit according to a type of the recording medium before recording data on the recording medium which has not been recorded;
    wherein the overall control module recognizes the non-use area as a recorded area that has been recorded, and determines whether an area on the recording medium is the recorded area or an unrecorded area that has not been recorded in the recording unit, and controls the recording/reproducing module to record data on an area which is determined as the unrecorded area.

5. The archive system according to claim 4, wherein the type of the recording medium is based on the number of layers of the recording medium.

6. A recording control method for recording information on a recordable area, which consists of recording units, of a recording medium, comprising:

designating a part of the recordable area as a non-use area where data should not be recorded in the recording unit according to a type of the recording medium before recording data on the recording medium which has not been recorded;

recognizing the non-use area as a recorded area that has been recorded;

determining whether an area on the recording medium is the recorded area or an unrecorded area that has not been recorded in the recording unit; and recording data on an area which is determined as the unrecorded area.

7. The recording control method according to claim 6, wherein the non-use area is arranged on an outer peripheral side of the recording medium.

8. The recording control method according to claim 6, wherein the type of the recording medium is based on the number of layers of the recording medium.

9. An archive management device which is connected to library devices, comprising;
   a control module which controls operation of a library device,
   wherein the library device includes;
      a recording/reproducing module that records data on a recordable area of a recording medium which includes a recording unit, or reproduces data on a recording medium,
   wherein the control module designates a part of the recordable area as a non-use area where data should not be recorded according to a type of the recording medium in the recording unit before recording data on the recording medium which has not been recorded; and
   wherein when the recording/reproducing module records data on the recording medium, the control module recognizes the non-use area as a recorded area that has been recorded, and determines whether an area on the recording medium is the recorded area or an unrecorded area that has not been recorded in the recording unit, and controls the recording/reproducing module to record data on an area which is determined as the unrecorded area.

10. The archive management device according to claim 9, wherein the non-use area is arranged on an outer peripheral side of the recording medium.

* * * * *